April 14, 1953  J. A. DI GIACINTO ET AL  2,635,051
PROCESS OF TREATING MUSHROOMS AND PRODUCT
Filed April 5, 1949
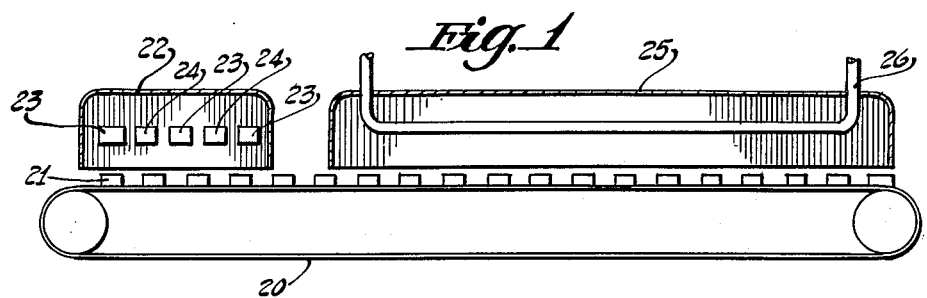
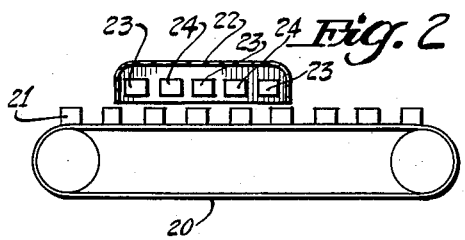
INVENTORS
Joseph A. DiGiacinto
and
BY Louis J. Amabili
ATTORNEYS Patented Apr. 14, 1953

2,635,051

UNITED STATES PATENT OFFICE 2,635,051

PROCESS OF TREATING MUSHROOMS AND PRODUCT

Joseph A. Di Giacinto, Tonghkenamon, Pa., and Louis J. Amabili, Hockessin, Del.

Application April 5, 1949, Serial No. 85,604

4 Claims. (Cl. 99—193)

The present invention relates to the preservation of mushrooms.

A purpose of the invention is to make it possible to freeze fresh mushrooms and have them remain unimpaired during storage of the frozen mushrooms.

A further purpose is to reduce the tendency of frozen mushrooms to darken during storage.

A further purpose is to avoid the necessity of blanching before freezing mushrooms.

A further purpose is to treat mushrooms with ozone, and to freeze the mushrooms.

A further purpose is to inhibit the activity of enzymes in mushrooms by exposure to radiation of a wave length ranging between 1000 and 2950 angstrom units, preferably between 1000 and 2200 angstrom units.

A further purpose is to sterilize mushrooms and inhibit the action of their enzymes by exposure to radiation having a wave length between 2201 and 2950 angstrom units.

A further purpose is to protect frozen mushrooms from air during storage.

A further purpose is to reduce the tendency of frozen mushrooms to blacken incident to cooking and serving.

Further purposes appear in the specification and in the claims.

In the drawings we have preferred to illustrate two only of the numerous devices which may be employed in the practice of the invention, selecting the forms shown from the standpoints of convenience in illustration, satisfactory operation and clear demonstration of the principles involved.

Figures 1 and 2 are diagrammatic central vertical sections of equipment by which the invention is applied.

In the drawings like numerals refer to like parts.

Great difficulty has been encountered in the effort to merchandise frozen mushrooms due to the fact that when ordinary raw or uncooked mushrooms are quick frozen without taking special precautions, the frozen mushrooms will get dark over a period of a few months' storage. Experiments have been conducted in the prior art in an effort to overcome this difficulty, and it has been found that mushrooms can be frozen and stored without any marked tendency to darken if the mushrooms are blanched (treated for a few minutes in boiling water) prior to freezing.

Blanching presents the difficulty, however, that partial cooking occurs, the mushrooms cease to be fresh mushrooms, and undergo lose of flavor along with the loss of freshness. Accordingly, up to the present time it has not been possible to produce a fresh frozen mushroom which can be stored over a period of a few months without darkening.

The present inventors have discovered that by treatment of the mushrooms with ozone, it becomes possible to quick freeze the mushrooms and store over any reasonable commercial period without darkening. The ozone treatment can be applied to the mushrooms prior to freezing, during freezing or subsequent to freezing as desired, but it normally will be preferable to apply the ozone first and quick freeze afterward.

In accordance with the invention, the mushrooms are exposed to treatment with ozone from any suitable source, immediately before, during or immediately after the quick freezing so as to eliminate or minimize the tendency to darken. The ozone source may be of any well known recognized character such as a quartz lamp, a silent electric discharge or spark discharge, but it is preferable to obtain the ozone from a source of radiation in the range between 1000 and 2950 angstrom units in wave length, applied in air. In one form of the invention, the mushrooms are periodically exposed to ozone treatment during frozen storage by ozonizing the air in the frozen storage locker or room.

It has been found that the elimination of darkening of the frozen mushrooms is most effective if they are maintained airtight during storage. One effective manner of maintaining the frozen mushrooms airtight is by individual airtight containers, having for example a plastic envelope sealed around the mushrooms, although of course, it will be understood that frozen mushrooms can be kept airtight in cans, sealed containers or storage chambers which are free from admission of outside air.

In one very desirable form of the invention, the radiation employed to treat the mushrooms must be in the range between 1000 and 2950 angstrom units in wave length. Any radiation in this range between 1000 and 2950 angstrom units may be used, but it is preferable to employ radiation of a specialized character within this range. The most desirable radiation is in the range between 1000 and 2200 angstrom units, as this radiation is the most effective to form ozone and therefore the most penetrating and has the most pronounced effect on the elimination of the tendency to darken.

There is, however, a by-product advantage in using radiation in the range between 2201 and 2950 angstrom unit, since this radiation, while less penetrating in its effect, nevertheless does reduce the tendency to darken, and also sterilizes the mushrooms or exerts germicidal action. For best results radiation of two characters should be employed, one within the range of 1000 and 2200 angstrom units for maximum penetration of the effect, and the other within the range of 2201 and 2950 angstrom units for additional treatment to prevent darkening and for sterilization.

It should be noted that the so-called sunlamp ultraviolet radiation, which is in the range between 2950 and 4000 angstrom units is wholly useless for the present invention and should not be employed.

We find that the penetration is adequate using a suitable electric lamp source in the range of 1000 to 2950 angstrom units to penetrate a layer of mushrooms two inches thick and adequately treat all mushrooms in the layer providing the lamp is located reasonably close to the layer (within three feet). The mushrooms should of course be directly exposed to the radiation, and should not be covered by any material which could exclude radiation.

The exposure time will vary, but it has been found that the effect is substantially instantaneous, while on the other hand over exposure is not harmful. For best results an exposure time of one to two minutes is employed.

The disclosure of the invention is complete without reference to theoretical considerations and accordingly, the theory of operation is not to be regarded as essential to the broader aspects of the invention. Available data indicate, however, that the benefit from the ozone in preventing or reducing the tendency of the frozen mushrooms to darken is due to the ability of the ozone to render enzymes in the mushrooms inactive for the period of storage of the mushrooms. Thus the enzymes are prevented from exerting their normal influence on the mushrooms to darken them, either during storage of the frozen mushrooms or subsequently during preparation or cooking or during serving of such mushrooms.

Therefore, whereas the prior art fresh or fresh frozen mushrooms have darkened during storage or upon exposure of a cut or broken surface to the air, the mushrooms which have been treated according to the present invention show a markedly less pronounced tendency to such darkening. The frozen fresh mushrooms can be stored for long periods without darkening after the mushrooms have been treated in accordance with the invention and likewise such mushrooms can be cut or broken during preparation, cooking, or serving without showing any pronounced tendency to darken. Unless the treatment by the ozone is applied in accordance with the invention, the enzymes will grow and cause darkening even during storage at 0° C.

The device of Figure 1 is intended to illustrate one convenient mechanism for applying the process of the invention. A conveyor 20 moves in either direction carrying boxes or other containers 21 of mushrooms, suitably having the lids open or removed so that the mushrooms in the boxes can be exposed to ozone. A housing 22 positioned above the conveyor and serving to protect the eyes of personnel from the radiation, which might otherwise damage them, contains electric lamps 23 which give forth radiation of a wave length between 1000 and 2200 angstrom units and electric lamps 24 which give forth radiation of a wave length between 2201 and 2950 angstrom units, preferably located a few inches (2 to 4 inches) above the mushrooms. Thus the mushrooms are exposed to radiation of both characters as they pass under the lamps on the conveyor, and ozone is available to treat them.

Before or after the mushrooms are exposed to the ozone, they also are carried through the quick freeze chamber 25 having an evaporator 26 of a mechanical refrigeration unit and maintained at an adequately low temperature to freeze the mushrooms quickly according to the well known process. The temperature in the quick freeze chamber is preferably minus 40° to 60° F., and in any case will be below 0° F. for best results.

Any other suitable quick freeze procedure may be used, such as a cold room for static storage, or a cold locker maintained at any suitable quick freezing temperature as well known. To illustrate this Figure 2 shows mechanism for applying the ozone treatment to the mushrooms, with the intention of quick freezing them in a cold room or the like immediately before or after the ozone treatment, and of then storing them in a frozen food storage.

After the mushrooms are processed in accordance with the invention they are of reduced enzyme activity and also frozen for storage.

For best results the quick frozen mushrooms are maintained airtight during storage and up to or through the time of retailing by envelopes, cartons, cans or other suitable containers or chambers. While the invention is beneficial even though the mushrooms are not kept airtight during frozen storage, there is some tendency for surface darkening where outside air is admitted, although the darkening of the interior of the mushrooms does not occur even on several months frozen storage where the ozone treatment of the invention has been applied.

It will be evident that the invention can be applied in other mechanism or entirely by hand, simply carrying the mushrooms individually in any suitable manner for exposure to the radiation and for placement in the quick freezing space, or quick freezing in the atmosphere at extreme winter temperature.

In view of our invention and disclosure variations and modifications to meet individual whim or particular need will doubtless become evident to others skilled in the art, to obtain all or part of the benefits of our invention without copying the process and product shown, and we, therefore, claim all such insofar as they fall within the reasonable spirit and scope of our claims.

Having thus described our invention what we claim as new and desire to secure by Letters Patent is:

1. The process of treating mushrooms to preserve them, which comprises exposing the mushrooms to treatment with ozone, and quick freezing the mushrooms, the steps being carried out in either order, and maintaining the mushrooms free from blanching throughout the process.

2. The process of treating mushrooms to preserve them, which comprises exposing the mushrooms to treatment with ozone, quick freezing the mushrooms, the previous steps being carried out in either order, storing the frozen mushrooms under airtight conditions, and maintaining the mushrooms free from blanching throughout the process.

3. The process of freezing mushrooms, which comprises exposing the mushrooms to radiation of a wave length between 1000 and 2200 angstrom units and thereby generating ozone which is brought into contact with the mushrooms, and quick freezing the mushrooms, the steps being carried out in either order, and maintaining the mushrooms free from blanching throughout the process.

4. The process of freezing mushrooms, which comprises treating the mushrooms by exposure to radiation of a wave length between 1000 and 2200 angstrom units and thereby generating ozone which is brought into contact with the mushrooms, treating the mushrooms by exposure to radiation of a wave length between 2201 and 2950 angstrom units and quick freezing the mushrooms, the steps being carried out in any order, and maintaining the mushrooms free from blanching throughout the process.

JOSEPH A. DI GIACINTO.
LOUIS J. AMABILI.

References Cited in the file of this patent

UNITED STATES PATENTS

| Number | Name | Date |
| --- | --- | --- |
| 1,910,009 | Grayson | May 23, 1933 |
| 2,070,307 | Nicholls | Feb. 9, 1937 |
| 2,364,049 | Bensel | Dec. 5, 1944 |
| 2,474,650 | Birdseye | June 28, 1949 |

OTHER REFERENCES

Tressler et al., The Freezing Preservation of Foods, Avi Pub. Co., N. Y. C., 1947, pp. 335–336.